United States Patent
Kunihiro

(10) Patent No.: US 7,463,372 B2
(45) Date of Patent: Dec. 9, 2008

(54) RECORDING SYSTEM AND CONTROL METHOD THEREFOR

(75) Inventor: Syunichi Kunihiro, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 697 days.

(21) Appl. No.: 11/044,447

(22) Filed: Jan. 27, 2005

(65) Prior Publication Data

US 2005/0179939 A1 Aug. 18, 2005

(30) Foreign Application Priority Data

Jan. 30, 2004 (JP) .............................. 2004-023584

(51) Int. Cl.
*H04N 1/23* (2006.01)

(52) U.S. Cl. ........................ 358/1.1; 258/296; 258/412; 258/426.01; 258/426.02; 258/426.07; 709/247

(58) Field of Classification Search ................ 358/300, 358/1.15, 412, 426.01, 426.02, 426.07, 426.08, 358/1.1; 710/68; 709/247; 382/232
See application file for complete search history.

(56) References Cited

U.S. PATENT DOCUMENTS

| | | | |
|---|---|---|---|
| 6,025,929 A | 2/2000 | Nakajima | |
| 6,606,039 B2 * | 8/2003 | Hirano et al. ................. | 341/65 |
| 6,711,296 B1 * | 3/2004 | Higuchi et al. .............. | 382/239 |
| 6,731,814 B2 * | 5/2004 | Zeck et al. ................... | 382/239 |
| 6,771,393 B1 * | 8/2004 | Honary ................... | 358/426.01 |
| 6,804,401 B2 * | 10/2004 | Nelson et al. ............... | 382/239 |
| 6,950,213 B1 * | 9/2005 | Gurevich .................... | 358/401 |
| 7,230,744 B2 * | 6/2007 | Christodoulou et al. ..... | 358/407 |
| 2002/0149800 A1 * | 10/2002 | Medina ................. | 358/426.02 |
| 2003/0107753 A1 | 6/2003 | Sakamoto | |
| 2003/0184813 A1 * | 10/2003 | Kobayashi et al. ..... | 358/426.01 |

FOREIGN PATENT DOCUMENTS

| | | | |
|---|---|---|---|
| EP | 817111 A2 * | 1/1998 | |
| EP | 853420 A2 * | 7/1998 | |
| JP | 2001-075765 A | 3/2001 | |
| JP | 2000-280582 A | 10/2002 | |
| JP | 2003-114778 A | 4/2003 | |

OTHER PUBLICATIONS

Goutong et al., "Image rendering for digital fax", Proceedings of the SPIE, 2003, vol. 5008, p. 504-512.*
Rucklidge et al., "A flexible network document imaging architecture", Proceedings of the SPIE, 2000, vol. 3964, p. 110-120.*

* cited by examiner

*Primary Examiner*—Kimberly A Williams
(74) *Attorney, Agent, or Firm*—Canon USA Inc I.P. Div

(57) ABSTRACT

A recording system including a recording apparatus connectable to a plurality of host devices via a plurality of interfaces with different transfer rates. When image data is transferred from one of the host devices to the recording apparatus via the respective interface, a compression method by which the image data is compressed is changed depending upon the transfer rate of the interface via which the image data is transferred and a processing rate of the recording apparatus.

14 Claims, 6 Drawing Sheets

RUN LENGTH ENCODING

ORIGINAL DATA ~301

| 0x00 | 0x00 | 0x00 | 0x00 | 0x02 | 0x01 | 0x02 | 0x02 | 0x02 | 0x02 |
|------|------|------|------|------|------|------|------|------|------|
| data | data | data | data | data | data | data | data | data | data |

⟵────────────────────────────────⟶ 302

COMPRESSED DATA

| 0x00 | 0x04 | 0x02 | 0x01 | 0x01 | 0x01 | 0x02 | 0x04 |
|------|------|------|------|------|------|------|------|
| data | [Len] | data | [Len] | data | [Len] | data | [Len] |

303 304            305

STATIC HUFFMAN CODING

ORIGINAL DATA

| a | a | a | b | b | c | c | c | c | d |
|---|---|---|---|---|---|---|---|---|---|
| 0x61 | 0x61 | 0x61 | 0x62 | 0x62 | 0x63 | 0x63 | 0x63 | 0x63 | 0x64 |

307        306

| SYMBOL | RATE OF APPEARANCE |
|--------|--------------------|
| a | 3/10 |
| b | 2/10 |
| c | 4/10 |
| d | 1/10 |

308

309

| SYMBOL | CODEWORD |
|--------|----------|
| a | 10 |
| b | 110 |
| c | 0 |
| d | 111 |

COMPRESSED DATA 10b   10b   10b   110b   110b   0b   0b   0b   0b   111b

| I/F | COMMUNICATION RATE |
|---|---|
| HIGH-RATE I/F | 10 Kbps |
| LOW-RATE I/F | 4 Kbps |

FIG. 4B

| COMPRESSION METHOD | COMPRESSION RATIO | DECOMPRESSION TIME |
|---|---|---|
| COMPRESSION A | 80% | 0.2 SEC |
| COMPRESSION B | 24% | 0.4 SEC |

FIG. 4C

| COMMUNICATION TIME | DECOMPRESSION TIME OF RECEIVED DATA | RECORDING IMAGE CREATING TIME |
|---|---|---|

←——————————— ONE SCAN ———————————→

FIG. 4D

405 — SPECIFICATION OF RECORDING DEVICE
 TIME REQUIRED FOR ONE SCAN  1.2 SEC
 RECORDING IMAGE CREATING TIME FOR ONE SCAN  0.2 SEC
 AMOUNT OF DATA FOR ONE SCAN  1280 BYTE

406 — HIGH-RATE I/F, COMPRESSION A
 COMMUNICATION TIME
  $\underbrace{1280 \times (80/100)}_{\text{(THE AMOUNT OF COMPRESSED DATA)}} \div \underbrace{(10 \times 1024/8)}_{\text{(UNIT TRANSFER RATE)}} = 0.8$ SEC DECOMPRESSION TIME
  $\underbrace{1280 \times (80/100)}_{\text{(THE AMOUNT OF COMPRESSED DATA)}} \div \underbrace{(1 \times 1024) \times 0.2}_{\text{(UNIT DECOMPRESSION TIME)}} = 0.2$ SEC 407 — LOW-RATE I/F, COMPRESSION A
 COMMUNICATION TIME
  $1280 \times (80/100) \div (4 \times 1024/8) = 2.0$ SEC
 DECOMPRESSION TIME
  $1280 \times (80/100) \div (1 \times 1024) \times 2.0 = 0.2$ SEC 408 — LOW-RATE I/F, COMPRESSION B
 COMMUNICATION TIME
  $1280 \times (20/100) \div (4 \times 1024/8) = 0.5$ SEC
 DECOMPRESSION TIME
  $1280 \times (20/100) \div (1 \times 1024) \times 2.0 = 0.5$ SEC

FIG. 5

| INTERFACE | USB | IrDA | BT | OTHERS |
|---|---|---|---|---|
| DETERMINATION | YES | YES | YES | NO |
| TYPE | HIGH-RATE | LOW-RATE | LOW-RATE | LOW-RATE |

RECORDING SYSTEM AND CONTROL METHOD THEREFOR

CROSS REFERENCE TO RELATED APPLICATIONS

This application is related to co-pending applications Ser. Nos. 11/044,985 and 11/044,845 filed on Jan. 27, 2005.

BACKGROUND OF THE INVENTION

1. Field of the Invention

The present invention relates to a recording system for recording image data transmitted from a host computer using a recording apparatus. More specifically, the present invention relates to a recording system including an ink-jet recording apparatus having a plurality of interfaces.

The recording apparatus of the present invention is applicable to any apparatus dealing with recording media, e.g., pieces of paper, cloth, leather, non-woven fabrics, overhead projector (OHP) sheets, recording media made of metal, etc. More specifically, the recording apparatus of the present invention may be implemented as an office machine, such as a printer, a copying machine, or a facsimile machine, an industrial production machine, or the like.

2. Description of the Related Art

With the recent popularity of personal computers, word processors, facsimile machines, etc., in the office or at home, a variety of printers having different recording methods have been developed as information output apparatuses for these devices. Ink-jet printers are suitable for business use in the office and for personal use at home because of their advantages, that is, easy color recording, low noise during operation, high-quality recording onto multiple recording media, compactness, etc. In particular, ink-jet recording apparatuses of the serial-scan type (hereinafter referred to as "recording apparatuses") in which a recording head is reciprocated so as to scan on a recording medium to perform recording can record images with high quality at low cost, and therefore have become widely used.

With the prevalence of recording apparatuses, a greater number of interfaces for connecting the recording apparatuses to host computers have become available. Interfaces include wire and wireless interfaces, namely, serial communication interfaces, parallel communication interfaces, and infrared communication interfaces. For example, a recording apparatus having a plurality of interfaces is disclosed in Japanese Patent Laid-Open No. 2000-280582.

With the ability of recording apparatuses to print high-resolution, high-quality images, multiple color images, etc., the capacity of image data has increased. With the high processing rate of printer engines, a large amount of image data has also been increasingly handled.

A host computer that transfers image data to a recording apparatus includes a plurality of interfaces having different transfer rates for a wide variety of applications, such as a USB (Universal Serial Bus) interface and a BT (Bluetooth) interface. The differences in the transfer rates cause a problem when image data is transferred from the host computer to the recording apparatus. For example, when a large amount of image data is transferred from the host computer via a high-rate interface, e.g., a USB 2.0 interface, the difference between the time required for transferring the image data and the time required for recording the image data is small and is therefore negligible.

However, when a large amount of image data is transferred via a low-rate interface, such as a BT interface, the time required for transferring the image data is longer than the time required for recording the image data, and therefore the performance of the printer engine cannot be fully utilized. In this case, a data queuing problem occurs in which the printer waits for the image data to be transferred and therefore the time required for recording becomes long.

The data queuing problem increases the number of nozzle recovery (preliminary ejection) procedures, which are performed at predetermined time intervals for maintaining high performance of ink ejection, and also increases the amount of wasted ink.

The ink-jet recording apparatus may also have other problems. When ink is applied to adjacent pixels, time differences for applying ink to the individual pixels cause differences in penetration of the ink into the recording medium. Large time differences cause color variations in a recorded image. Data queuing causes the recording intervals (scan intervals) to randomly change, and an output image is therefore susceptible to color variations.

When an amount of image data that is reduced by reducing the number of grayscale levels is transferred from a host computer to a recording apparatus via a low-transfer-rate interface, the image quality is greatly reduced although the occurrence of data queuing is avoidable. Even when such image data is transferred via a high-rate interface, which does not cause a data queuing problem, the image quality is also degraded.

One method to overcome these problems is to transfer data that is compressed with a high compression ratio from a host computer to a recording apparatus. Generally, it takes a longer time to decompress high-ratio compressed data than low-ratio compressed data. Therefore, when data compressed with a high compression ratio is transferred from a host computer to a recording apparatus, the recording apparatus requires a long time to decompress the compressed data, and must wait for the data to be decompressed. Thus, data queuing may also occur.

Typically, data to be transferred from a host computer to a recording apparatus is compressed with a low compression ratio, which does not cause data queuing due to the decompression time. A compression method using a low compression rate does not cause data queuing, and is therefore useful if there is no fear that data queuing occurs due to the communication rate.

Therefore, it is not desirable that data transferred from a host computer to a recording apparatus be compressed with a high compression ratio regardless of the communication rate.

SUMMARY OF THE INVENTION

The present invention is directed to a recording system including a recording apparatus having a plurality of interfaces with different transfer rates in which image data can be recorded in the optimum way depending upon the interface used for transferring the image data.

In an aspect of the present invention, a recording system includes a host device, a communication line, and a recording apparatus that is connected to the host device via the communication line. The host device is operable to transmit image data to the recording apparatus, and the recording apparatus records an image onto a recording medium based on the image data transmitted from the host device. The host device includes a determining unit configured to determine an encoding method to encode the image data for data compression based on at least one of a data communication rate of the communication line and a processing rate of the recording apparatus, an encoding unit that encodes the image data based on the encoding method determined by the determining unit, and a transmitting unit that transmits the image data encoded by the encoding unit to the recording apparatus via the communication line. The recording apparatus includes a receiving unit that receives the encoded image data from the host device via the communication line, a decoding unit that decodes the encoded image data received by the receiving unit, and a recording unit that records the image based on the image data decoded by the decoding unit.

The present invention is also directed to a control method of controlling the above recording system. In another aspect of the present invention, a control method for a recording system including a host device and a recording apparatus connected to the host device via a communication line, the host device transmitting image data to the recording apparatus, the recording apparatus recording an image onto a recording medium based on the image data transmitted from the host device, includes: a determining step of determining an encoding method to encode the image data for data compression based on at least one of a data communication rate of the communication line and a processing rate of the recording apparatus, an encoding step of encoding the image data based on the encoding method determined in the determining step, a transferring step of transferring the image data encoded in the encoding step to the recording apparatus from the host device via the communication line, a decoding step of decoding the encoded image data encoded in the encoding step, and a recording step of recording an image based on the image data decoded in the decoding step.

In yet another aspect, a method for controlling a recording system including a recording apparatus connectable to a plurality of host devices via a plurality of interfaces includes: a receiving step of receiving a recording instruction from one of the host devices to record an image C based on image data; a first determining step of determining whether the interface of the one host device is identifiable; a second determining step of determining whether the interface of the one host device is a predetermined interface responsive to determining that the interface of the one host device is identifiable in the first determining step; a first compression step of compressing the image data with a first compression ratio responsive to determining in the second determining step that the interface of the one host device is the predetermined interface; a second compression step of compressing image data with a second compression ratio responsive to at least one of determining in the first determining step that the interface of the one host device is not identifiable and determining in the second determining step that the interface of the one host device is not the predetermined interface; a transfer step of transferring the image data compressed in at least one of the first and second compression steps to the recording apparatus; a decompression step of decompressing the compressed image data transferred in the transfer step; and a recording step of recording the image based on the image data decompressed in the decompression step.

Further features and advantages of the present invention will become apparent from the following description of the exemplary embodiments with reference to the attached drawings.

BRIEF DESCRIPTION OF THE DRAWINGS

FIGS. 4A to 4D are schematic views showing compressed data and the decompression time in an embodiment of the present invention.

FIG. 5 is a table schematically showing interfaces and interface types in an embodiment of the present invention.

DESCRIPTION OF THE EMBODIMENTS

Embodiments of the present invention will now be described in detail with reference to the drawings.

A recording apparatus according to an embodiment of the present invention includes an ink-jet recording head.

Throughout the document, the term "record (or print)" means forming not only significant information, such as text and patterns, but also significant or insignificant human-visible or invisible images, graphics, patterns, etc., on a wide variety of recording media, or modifying the media.

Recording media in the present invention include not only pieces of paper, which are typically used in recording apparatuses, but also a wide variety of media capable of receiving ink, such as pieces of cloth and leather, plastic films, metal plates, and media made of glass, ceramic, and wood.

The term "ink (or liquid)" should be broadly construed, and means liquid that is applied to a recording medium so that images, graphics, patterns, etc., can be formed on the recording medium, the recording medium can be modified, or ink processing can be performed (e.g., coloring material in the ink applied to the recording medium can be solidified or insolubilized).

The term "nozzle" means an outlet or a liquid path communicating with the outlet, and an element that generates energy necessary for ejecting ink, unless specified.

Figure 1:
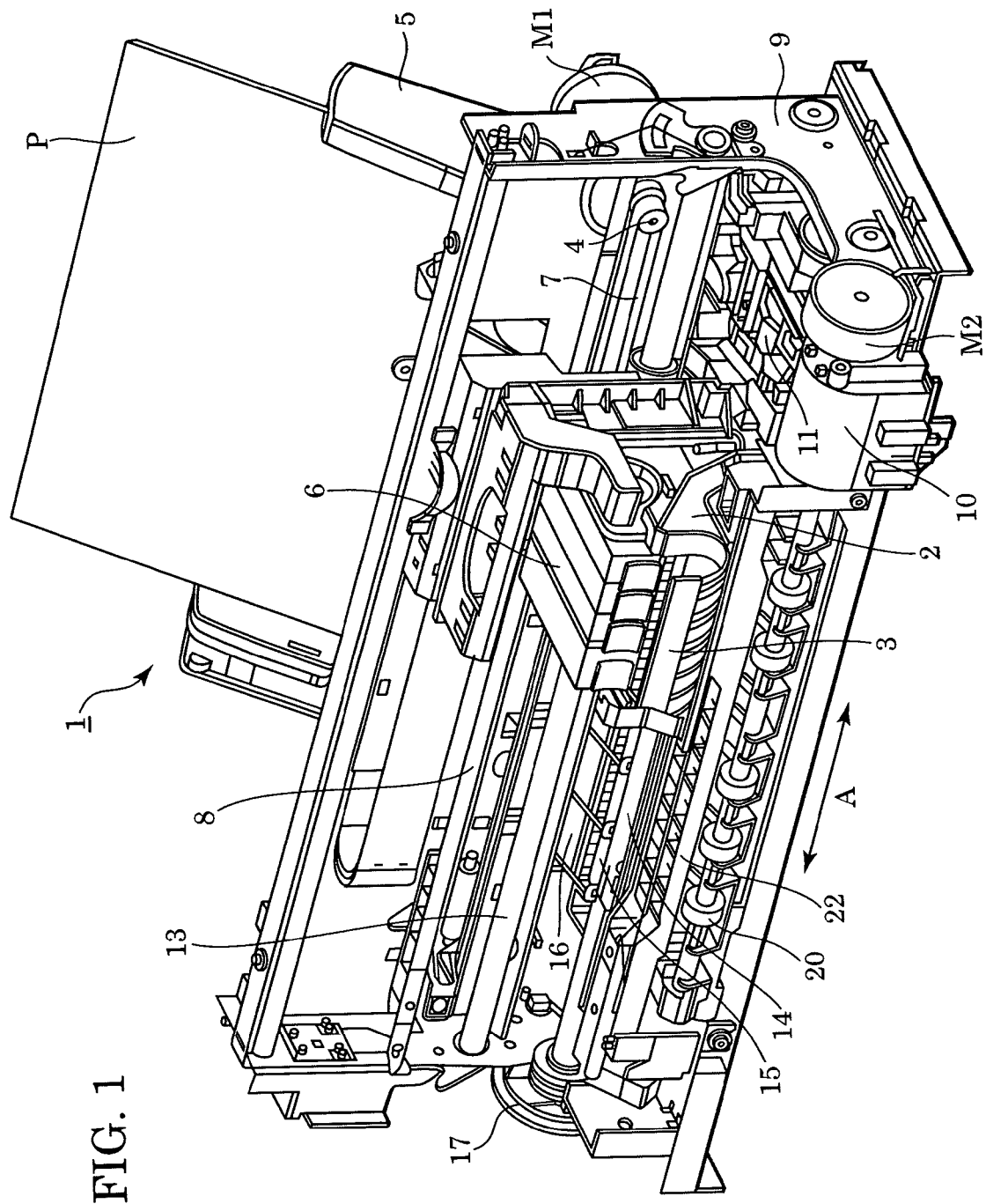
FIG. 1 is a schematic external perspective view of an ink-jet recording apparatus.

FIG. 1 is a schematic external perspective view of an ink-jet recording apparatus (hereinafter referred to as a "recording apparatus") 1 according to an embodiment of the present invention.

The recording apparatus 1 shown in FIG. 1 includes a carriage 2 having an ink-jet recording head 3 that ejects ink for recording. A driving force generated by a carriage motor M1 is transmitted to the carriage 2 by a transmission mechanism 4 so as to reciprocate the carriage 2 in the direction indicated by an arrow A and to feed a recording medium P, e.g., a sheet of paper, to a recording position using a feeding mechanism 5. At the recording position, ink is ejected onto the recording medium P from the recording head 3 for recording.

In order to maintain high performance of the recording head 3, the carriage 2 is moved to the position of a recovery device 10 to intermittently recover the ejection performance of the recording head 3.

The carriage 2 of the recording apparatus 1 carries not only the recording head 3 but also ink cartridges 6 for storing ink to be supplied to the recording head 3. The ink cartridges 6 are removable with respect to the carriage 2.

The recording apparatus 1 shown in FIG. 1 supports color recording, and the carriage 2 carries four ink cartridges that store ink of magenta (M), cyan (C), yellow (Y), and black (K). The four ink cartridges are independently removable.

The carriage 2 and the recording head 3 are electrically connected by appropriately contacting the abutting surfaces of these components. When energy is applied according to a recording signal, the recording head 3 selectively ejects ink from a plurality of outlets for recording. In the present embodiment, the recording head 3 is an ink-jet recording head that ejects ink using thermal energy, and includes an electrothermal energy converter for generating thermal energy. The electrical energy applied to the electrothermal energy converter is converted into thermal energy, and the thermal energy is applied to ink to induce film boiling. The film boiling causes bubble growth and shrinkage, and the pressure changes, thereby ejecting ink from the outlets. The electrothermal energy converter is provided for each outlet, and a pulse voltage is applied to a certain electrothermal energy converter according to a recording signal to eject ink from the corresponding outlet.

As shown in FIG. 1, the carriage 2 is connected to a portion of a drive belt 7 of the transmission mechanism 4 that transmits a driving force of the carriage motor M1, and is supported so as to be slidably guided along a guide shaft 13 in the direction indicated by the arrow A. Thus, the carriage 2 is reciprocated along the guide shaft 13 by forward or reverse rotation of the carriage motor M1. A scale 8 for indicating the absolute position of the carriage 2 is disposed in the moving direction of the carriage 2 (i.e., the direction indicated by the arrow A). In the present embodiment, the scale 8 is formed of a transparent polyethylene terephthalate (PET) film on which black bars are printed at desired pitches. One end of the scale 8 is fixed to a chassis 9, and the other end is supported by a plate spring (not shown).

The recording apparatus 1 further includes a platen (not shown) so as to face a surface in which the outlets (not shown) of the recording head 3 are formed. The driving force generated by the carriage motor M1 causes the carriage 2 carrying the recording head 3 to be reciprocated, and a recording signal is applied to the recording head 3 to eject ink. Thus, recording is performed over the recording medium P fed onto the platen.

In FIG. 1, a feed roller 14 for feeding the recording medium P is driven by a feed motor M2. A pinch roller 15 brings the recording medium P into abutment against the feed roller 14 using a spring (not shown). A pinch roller holder 16 rotatably supports the pinch roller 15. One end of the feed roller 14 is fixed to a feed roller gear 17. Rotation of the feed motor M2 is transmitted to the feed roller gear 17 via an intermediate gear (not shown), and drives the feed roller 14.

A discharge roller 20 is driven when the rotation of the feed motor M2 is transmitted, and discharges the recording medium P on which an image is formed by the recording head 3 to the outside of the recording apparatus 1. The discharge roller 20 is abutted against a spur roller (not shown) that presses the recording medium P using a spring (not shown). A spur holder 22 rotatably supports the spur roller. A cap 11 is cap of the recording head 3.

Figure 2:
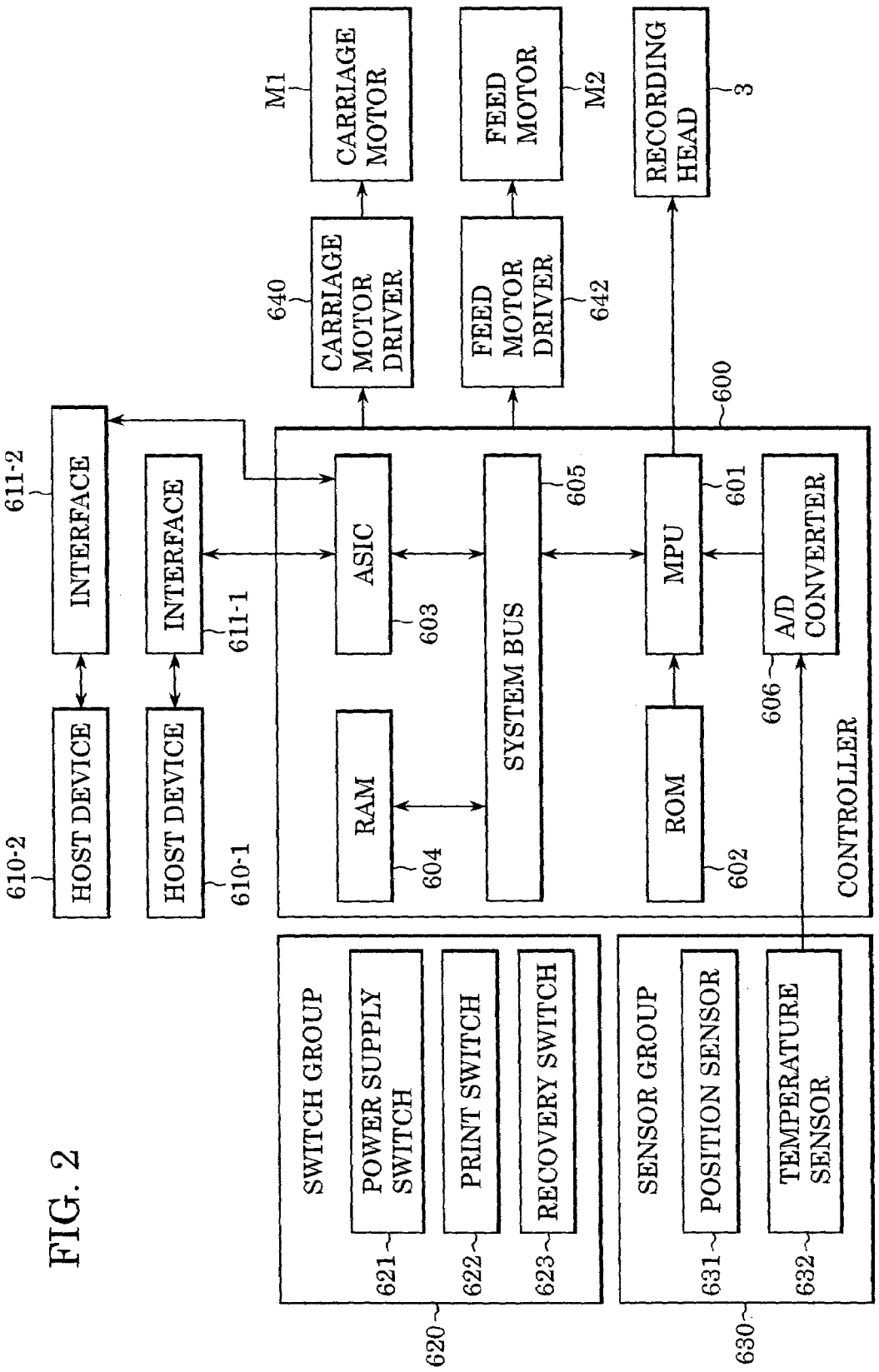
FIG. 2 is a block diagram of a control circuit of the ink-jet recording apparatus.

FIG. 2 is a block diagram of a control mechanism of the recording apparatus 1 shown in FIG. 1.

As shown in FIG. 2, a controller 600 includes a microprocessor (MPU) 601, a read-only memory (ROM) 602, an application specific integrated circuit (ASIC) 603, a random access memory (RAM) 604, a system bus 605 that connects the MPU 601, the ASIC 603, and the RAM 604 to exchange data, and an analog-to-digital (A/D) converter 606. The ROM 602 stores a program for a control sequence described below, a predetermined table, and other fixed data. The ASIC 603 generates a control signal for controlling the carriage motor M1, a control signal for controlling the feed motor M2, and a control signal for controlling the recording head 3. The RAM 604 includes an area for expanding image data, a work area for executing the program, etc. The A/D converter 606 receives and converts an analog signal from a sensor group described below into a digital signal, and supplies the digital signal to the MPU 601.

In FIG. 2, a host device 610-1 may be a computer (e.g., an image reader or a digital camera) serving as a source for supplying image data. A host device 610-2 may also be a computer. The host device 610-1 transmits and receives image data, a command, a status signal, etc., to and from the recording apparatus 1 via an interface (I/F) 611-1. The host device 610-2 also transmits and receives image data, a command, a status signal, etc., to and from the recording apparatus 1 via an interface (I/F) 611-2 having a different communication rate from that of the interface (I/F) 611-1. In the present embodiment, the interfaces 611 and 611-2 have different transfer rates.

A switch group 620 includes switches for receiving instructions input from the user, including a power supply switch 621, a print switch 622 for giving an instruction to start printing, and a recovery switch 623 for giving an instruction to initiate processing (recovery processing) to maintain high ink ejection performance of the recording head 3. A sensor group 630 for detecting the state of the recording apparatus 1 includes a position sensor 631 for detecting a home position, e.g., a photocoupler, and a temperature sensor 632 disposed in position of the recording apparatus 1 for detecting the ambient temperature.

A carriage motor driver 640 drives the carriage motor M1 to reciprocate the carriage 2 in the direction indicated by the arrow A shown in FIG. 1. A feed motor driver 642 drives the feed motor M2 to feed the recording medium P.

The ink-jet recording apparatus 1 having the structure described above stores image data transferred from the host device 610-1 or 610-2 via the interface 611-1 or 611-2 in the RAM 604. The stored image data is converted into recording data indicating ink ejection information, and the converted data is stored in the RAM 604. In a recording mode, ink is ejected from the recording head 3 according to the recording data, and an image based on the image data is formed.

Figures 3A, 3B:
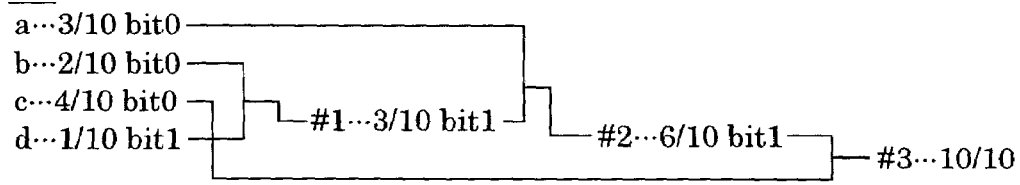
FIGS. 3A and 3B are illustrations of typical compression algorithms in the present invention.

FIGS. 3A and 3B illustrate typical compression algorithms, namely, run length encoding and static Huffman coding, respectively.

The run length encoding technique shown in FIG. 3A provides data compression with a lower compression ratio.

Original data 301 is 10-byte data having a data length 302. Run length encoding deals with data and repetition of the data. Repetition of the first data 0x00 occurs four times. The four repetitions are represented by data 303 and length 304 indicating repetition of the data 303. In this example, the data 303 is represented by 0x00 and the length 304 is represented by 0x04. Repetition of the subsequent data 0x02 does not occur, and therefore the length 304 is represented by 0x01. The original data 301 is compressed under this rule from 10 bytes 302 into 8 bytes 305, and the compression ratio is 80%. Even though this is a low compression ratio, the run length encoding technique is advantageous in that it provides easy compression and decompression and high-rate decompression.

The static Huffman coding technique shown in FIG. 3B provides data compression with a higher compression ratio.

Original data "aaabbccccd" has a data length 306 of 10 bytes. An appearance table 307 shows the rate of appearance of each byte in the original data, that is, the frequency at which each byte appears in the overall data. A Huffman tree is constructed based on the appearance table 307. In static Huffman coding, shorter codes are allocated to characters with a higher rate of appearance. Character "d" with the lowest rate of appearance and character "b" with the second lowest rate of appearance are combined into a set #1. The set #1 stores pointers or indices to character "d" and character "b", and the sum of the rate of appearance of character "b" and the rate of appearance of character "d" is equal to the rate of appearance of the set #1. In the set #1, the character with a lower rate of appearance is allocated bit 0 and the character with a higher rate of appearance is allocated bit 1. The combination of bit 0 and bit 1 constitutes a codeword. The set #1 with the lowest rate of appearance and character "a" are combined into a set #2, and the set #2 is allocated code bits. The set #2 with the lowest rate of appearance and character "c" are also combined into a set #3. Thus, a Huffman tree 308 is constructed.

The root of the Huffman tree 308 is reached from each character tree to determine a codeword. The codewords are uniquely decoded.

A frequency table is created in the manner shown below, wherein each frequency is represented by 8 bits, and the frequencies of 0 h to 255 h are as below. Characters "a", "b", etc., to be used for encoding and the order of the characters are determined in advance between a transmitter and a receiver. For example, the characters are used in order of " . . . a, b, c, d, . . . ". Therefore, all characters do not need to be sent from the transmitter to the receiver one by one. In order to create a frequency table on the receiver side, the frequencies of the characters are transmitted from the transmitter to the receiver. In the present embodiment, four characters "a", "b", "c", and "d" are used, and other characters are not used. The following frequency data indicating the frequencies of these characters is transmitted from the transmitter to the receiver:

0, 0, 0 . . . 0, 3, 2, 4, 1, 0 . . . 0, 0

In order to reconstruct the rates of appearance 307, the length, i.e., the number of bytes, of the original data is required. The transmitter sends the length of the original data to the receiver, and the receiver reconstructs the rates of appearance 307 and obtains codewords 309.

The original data is converted as below based on the codewords 309:

"aaabbccccd"

→"10*b*, 10*b*, 10*b*, 110*b*, 110*b*, 0*b*, 0*b*, 0*b*, 0*b*, 111*b*"

The original data has 8-bit characters, and the original data is therefore given by 8×10=80 bits. The converted data is represented by 19 bits. Thus, the original data is converted from 80 bits to 19 bits using the static Huffman coding technique, and a high compression ratio is achieved. In static Huffman coding, it is necessary to transmit converted data and a frequency table generated from the rates of appearance. A frequency table including the frequencies of 0 h to 255 h requires 256 bytes. Thus, there is no advantage when compressing a small amount of original data.

FIGS. 4A to 4D shows the relationship among the communication rate of interfaces of the recording apparatus according to the present embodiment, the decompression time of compressed data, and the recording time.

As shown in FIG. 4A, the recording apparatus according to the present embodiment includes a high-rate interface (I/F) and a low-rate interface (I/F), and the transfer (communication) rate of the former interface is about two times higher than that of the latter interface.

FIG. 4B shows the time required for the recording apparatus to decompress a predetermined amount of data compressed using different compression methods A and B. The data compressed using different methods have different compression ratios. The compression method A has a compression ratio (the ratio of the amount of data before being compressed to the amount of compressed data) as low as 80%, but requires a shorter decompression time. The compression method B has a compression ratio as high as 24%, but requires a long decompression time. In the present invention, the data compressed using the compression method B is decompressed by software by the MPU 601. Ideally, the decompression time is 0.4 sec, as shown in FIG. 4B; however, the time required for the MPU 601 to decompress the data in parallel with other processing is longer than that shown in FIG. 4B.

FIG. 4C shows the relationship between the time required for the recording apparatus to perform one-time recording and scanning, and the time required for generating recording data for use in the subsequent recording and scanning. The recording apparatus does not need to wait for image data to be received if the time required for performing one-time recording and scanning (i.e., scanning of the carriage and a recording operation) in the main scanning direction is longer than the time required from when image data to be used for the subsequent recording and scanning is received until the received image data is decompressed and recording data (image) to be recorded is completely generated.

FIG. 4D shows the relationship among the communication rates of the interfaces of the recording apparatus, the time required for decompressing the compressed data, and the recording time.

The recording apparatus has a specification 405. In this case, the total of the time (communication time) required for receiving image data for the subsequent one-time scanning and the decompression time must be within 1.0 sec, given by 1.2 sec-0.2 sec, in order to prevent the recording apparatus from waiting for image data to be received.

In FIG. 4D, in a case 406, a host device compresses data using the compression method A, and the recording apparatus receives the compressed data via a high-rate I/F, and decompresses the received data.

The amount of compressed data is given by multiplying the amount of image data for one-time recording and scanning (the amount of data for one scan), i.e., 1280 bytes, by the compression ratio, i.e., 80/100. The amount of data transferred per unit time by the high-rate I/F, in byte/s, is given by dividing the communication rate, i.e., 10 Kbps (10×1024 bps), by 8. The communication time required for transferring the data for one scan to the recording apparatus via the high-rate I/F is therefore given by dividing the amount of compressed data by the amount of data transferred per unit time, and the communication time is 0.8 sec.

The amount of data decompressed per unit time, in byte/s, for 1 Kbyte (1×1024 bytes) of data compressed using the compression method A is given by 1×1024/0.2. Therefore, the time required for decompressing compressed data for one scan is given by dividing the amount of compressed data by the amount of data decompressed per unit time, and the decompression time is 0.2 sec.

The total of the communication time and the decompression time is 1.0 sec. Therefore, in the case where the data compressed by the host device using the compression method A is received by the recording apparatus via the high-rate I/F, the recording apparatus receives and decompresses data for the subsequent scan to form an image while recording data for one scan.

In FIG. 4D, in a case 407, a host device compresses data using the compression method A, and the recording apparatus receives the compressed data via the low-rate I/F. In this case, the communication time is 2.0 sec because the low-rate IF has a low transfer rate per unit time. The total of the communication time and the decompression time is 2.2 sec. Therefore, the recording apparatus does not receive and decompress data for the subsequent scan to form an image while recording data for one scan. In this case, data queuing occurs until an image is formed after recording data for one scan.

In FIG. 4D, in a case 408, a host device compresses data using the compression method B, and the recording apparatus receives the compressed data via the low-rate I/F. In this case, the communication time for data for one scan is as high as 0.5 sec because the data has been compressed with a high compression ratio, whereas, the decompression time is as low as 0.5 sec. The total of the communication time and the decompression time is 1.0 sec. Therefore, the recording apparatus receives and decompresses data for the subsequent scan to form an image while recording data for one scan without data queuing occurring until an image is formed.

In the present invention, the data compressed using the compression method B is decompressed by software by the MPU 601, and the decompression time is ideally 0.4 sec, as shown in FIG. 4B. However, the time required for the MPU 601 to decompress the data in parallel with other processing is longer than that shown in FIG. 4B.

Actually, when data compressed using the high-compression-ratio compression method B is transferred from a host computer to the recording apparatus, the compressed data is decompressed by software by the MPU 601, and data queuing can occur if the MPU 601 performs decompression in parallel with other processing, which requires a longer time than that shown in FIG. 4B. In the present invention, therefore, when data is transferred from a host computer to the recording apparatus via a high-rate interface, the low-compression-ratio compression method A is employed because data queuing caused by the communication rate does not occur.

Accordingly, even when data is received via a low-rate I/F, the communication time and the decompression time of the received data are considered to achieve the optimum recording without data queuing.

Figure 6:
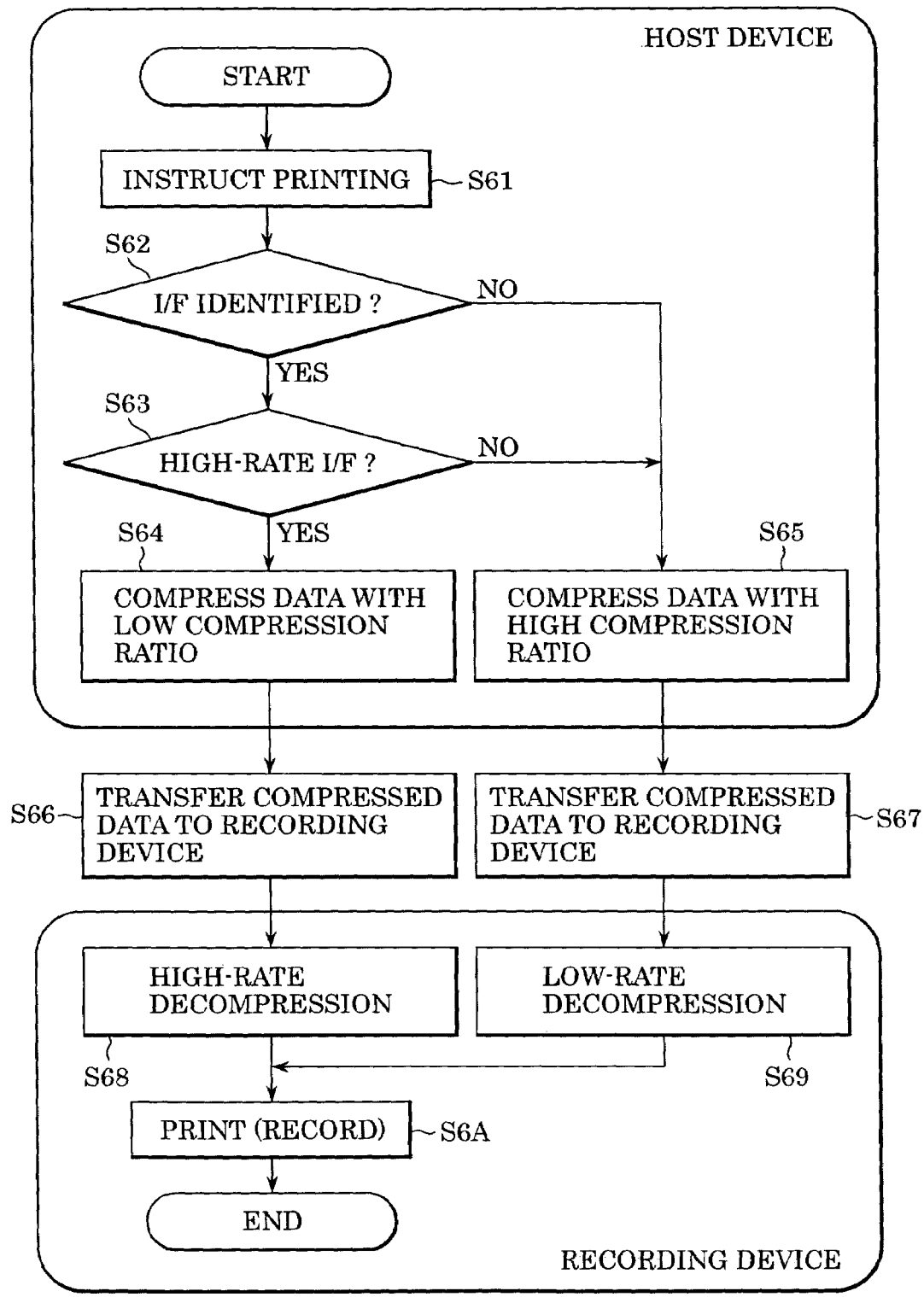
FIG. 6 is a flowchart showing a process according to an embodiment of the present invention.

FIG. 6 is a flowchart showing a process according to the present embodiment.

The processing of steps S61 to S65 is performed in a host device, and the processing of steps S68 to S6A is performed in a recording apparatus. The processing of steps S61 to S65 is performed by a printer driver installed in the host device.

In step S61, a recording instruction is given by the host device. The host device performs communication to inform the recording apparatus of the recording instruction. In step S62, it is determined whether or not an interface that is connected between the host device and the recording apparatus can be identified. If the interface cannot be identified, the process proceeds to step S65. If the interface can be identified, then in step S63, it is determined whether or not the interface is a high-rate I/F.

In the present embodiment, determination of the interface is performed based on a table shown in FIG. 5, which also includes the interface type, that is, a high-rate IF or a low-rate IF. In the present embodiment, as shown in FIG. 5, if the interface connected between the host device and the recording apparatus is any of USB, IrDA, and BT interfaces, the interface can be identified.

If it is determined in step S63 that the interface is a high-rate interface, in step S64, compressed data is generated using a compression method with a low compression ratio, such as that shown in FIG. 3A.

If it is determined in step S62 that the interface cannot be identified or if it is determined in step S63 that the interface is a low-rate interface, in step S65, compressed data is generated using a compression method with a high compression ratio, such as that shown in FIG. 3B.

In step S66, the compressed data generated in step S64 is transferred to the recording apparatus via the high-rate interface. In step S67, the compressed data generated in step S65 is transferred to the recording apparatus via the low-rate interface.

In steps S66 and S69, the received compressed data are decompressed using the corresponding compression methods. In step S6A, the decompressed data is recorded.

Accordingly, recording data is compressed using a compression method (compression ratio) depending upon the interface type (i.e., the transfer rate of the interface) and the decompression time of the compressed data by the recording apparatus, and the compressed data is sent from the host device to the recording apparatus. Thus, the recording apparatus can record the data without data queuing. Since data queuing does not occur, the occurrence of color variations in an image can be prevented. The time required for recording is also reduced.

In the present invention, the compression ratio of the data to be transferred to the recording apparatus is changed to adjust the amount of data (or to adjust the transfer time). In a recording apparatus having a plurality of ink colors with relatively different ink densities, such as dark ink colors and light ink colors, or a recording apparatus having other ink colors, e.g., red, blue, green, etc., the number of ink colors to be used for recording may be changed to adjust the amount of data to be transferred to the recording apparatus.

In the present embodiment, as shown in FIG. 6, if the interface connected between a host device and a recording apparatus cannot be identified, the interface is regarded as a low-rate interface. It can be determined whether the interface is a high-rate or low-rate interface in view of a possibly connected interface and the transfer capability of the interface. In the illustrated embodiment, two interface types are used. However, three or more interface types may be used to more specifically determine the interface type, and the recording methods corresponding to the transfer rates of the individual interface types may be used.

Even when the transfer rate of an interface has no problem, in an environment where a printer on a network is shared by a plurality of users, it is not desirable that a large volume of data be transferred over the network. In this case, this interface is regarded as an interface having a low transfer rate, thus reducing the amount of data to be recorded, which is transmitted over the network.

While the present invention has been described with reference to what are presently considered to be exemplary embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

This application claims priority from Japanese Patent Application No. 2004-023584 filed Jan. 30, 2004, which is hereby incorporated by reference herein.

What is claimed is:

1. A recording system comprising:
   a host device, a communication line, and a recording apparatus connected to the host device via the communication line, wherein the host device is operable to transmit image data to the recording apparatus and the recording apparatus records an image onto a recording medium based on the image data transmitted from the host device, the recording apparatus recording the image with an ink-jet recording head moved by moving a carriage;
   the host device comprising:
      a determining unit configured to determine an encoding method to encode the image data for a data compression rate that is a lowest compression rate among data compression rates in time of not over a time for one recording scan of the carriage based on at least one of a data communication rate of the communication line and a processing rate of the recording apparatus;

an encoding unit encoding the image data based on the encoding method determined by the determining unit; and a transmitting unit transmitting the image data encoded by the encoding unit to the recording apparatus via the communication line;

the recording apparatus comprising:

a receiving unit receiving the encoded image data from the host device via the communication line;

a decoding unit decoding the encoded image data received by the receiving unit; and a recording unit recording the image based on the image data decoded by the decoding unit.

2. The recording system according to claim 1, wherein the recording apparatus further comprises an interface facilitating connecting to a plurality of communication lines having different data communication rates, and wherein the determining unit determines the encoding method based on the data communication rate of the communication line connected to the recording apparatus via the interface.

3. The recording system according to claim 2, wherein the determining unit determines the encoding method from a plurality of encoding methods by which the image data is compressed with different compression ratios.

4. The recording system according to claims 2, wherein the determining unit determines the encoding method by comparing the at least one of the data communication rate and the processing rate of the recording apparatus, with a recording time by the recording apparatus.

5. The recording system according to claims 2, wherein the determining unit determines the encoding method based on a decoding time required by the decoding unit to decode the encoded image data.

6. A control method for a recording system including a host device and a recording apparatus connected to the host device via a communication line, the host device configured to transmit image data to the recording apparatus and the recording apparatus recording an image onto a recording medium based on the image data transmitted from the host device, the recording apparatus recording the image with an ink-jet recording head moved by moving a carriage, the method comprising the following steps:

a determining step of determining an encoding method to encode the image data for a data compression rate that is a lowest compression rate among data compression rates in time of not over a time for one recording scan of the carriage based on at least one of a data communication rate of the communication line and a processing rate of the recording apparatus;

an encoding step of encoding the image data based on the encoding method determined in the determining step;

a transferring step of transferring the image data encoded in the encoding step to the recording apparatus from the host device via the communication line;

a decoding step of decoding the encoded image data encoded in the encoding step; and a recording step of recording an image based on the image data decoded in the decoding step.

7. The control method according to claim 6, wherein the recording apparatus is connectable to a plurality of communication lines having different data communication rates, and wherein the determining step includes determining the encoding method based on the data communication rate of the communication line connected to the recording apparatus.

8. The control method according to claim 7, wherein the determining step includes determining the encoding method from a plurality of encoding methods by which the image data is compressed with different compression ratios.

9. The control method according to claim 7, wherein the determining step includes determining the encoding method by comparing the at least one of the data communication rate and the processing rate of the recording apparatus, with a recording time by the recording apparatus.

10. The control method according to claim 7, wherein the determining step includes determining the encoding method based on a time required to decode the encoded image data in the decoding step.

11. A method for controlling a recording system including a recording apparatus connectable to a plurality of host devices via a plurality of interfaces, the method comprising the following steps:

a receiving step of receiving a recording instruction from one of the host devices to record an image based on image data;

a first determining step of determining whether the interface of the one host device is identifiable;

a second determining step of determining whether the interface of the one host device is a predetermined interface responsive to determining that the interface of the one host device is identifiable in the first determining step;

a first compression step of compressing the image data with a first compression ratio responsive to determining in the second determining step that the interface of the one host device is the predetermined interface;

a second compression step of compressing image data with a second compression ratio responsive to at least one of determining in the first determining step that the interface of the one host device is not identifiable and determining in the second determining step that the interface of the one host device is not the predetermined interface;

a transfer step of transferring the image data compressed in at least one of the first and second compression steps to the recording apparatus;

a decompression step of decompressing the compressed image data transferred in the transfer step; and a recording step of recording the image based on the image data decompressed in the decompression step.

12. The control method according to claim 11, wherein the predetermined interface includes a high-rate interface.

13. The control method according to claim 11, wherein the first compression ratio includes a low compression ratio.

14. The control method according to claim 11, wherein the second compression ratio includes a high compression ratio.

* * * * *